US008553692B2

(12) United States Patent
Roay

(10) Patent No.: US 8,553,692 B2
(45) Date of Patent: Oct. 8, 2013

(54) GENERIC UDP MULTIPLEXING FOR VOICE OVER INTERNET PROTOCOL (VOIP)

(75) Inventor: Binod Roay, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 897 days.

(21) Appl. No.: 11/716,272

(22) Filed: Mar. 9, 2007

(65) Prior Publication Data

US 2008/0219262 A1    Sep. 11, 2008

(51) Int. Cl.
    *H04L 12/28* (2006.01)
(52) U.S. Cl.
    USPC .......................................................... 370/392
(58) Field of Classification Search
    USPC .................................................. 370/389, 392
    See application file for complete search history.

(56) References Cited

U.S. PATENT DOCUMENTS

| | | | | |
|---|---|---|---|---|
| 6,618,368 | B1 * | 9/2003 | Tanigawa et al. | 370/352 |
| 6,804,237 | B1 * | 10/2004 | Luo et al. | 370/392 |
| 2003/0193950 | A1 * | 10/2003 | Philips et al. | 370/392 |
| 2007/0183423 | A1 * | 8/2007 | Passarella et al. | 370/392 |
| 2007/0201435 | A1 * | 8/2007 | Fisher | 370/352 |
| 2008/0123639 | A1 * | 5/2008 | Saito et al. | 370/389 |
| 2009/0219939 | A1 * | 9/2009 | Isosaari | 370/400 |

OTHER PUBLICATIONS

Mark Handley, "GeRM: Generic RTP Multiplexing", Memo to Internet Engineering Task Force, Draft dated Nov. 11, 1998, 7 pages.
AVT Working Group: J. Rosenberg, H. Schulzrinne, "Issues and Options for RTP Multiplexing", Memo to Internet Engineering Task Force, Draft dated Oct. 1, 1998, 27 pages.
AVT Working Group: J. Rosenberg, H. Schulzrinne, "An RTP Payload Format for User Multiplexing", Memo to Internet Engineering Task Force, Draft dated May 6, 1998, 10 pages.
Bruce Thompson, Tmima Koren, Dan Wing, Cisco Systems, Tunneling multiplexed Compressed RTP ("TCRTP"), Draft dated Jul. 19, 2001, 14 pages.

* cited by examiner

*Primary Examiner* — Mark Rinehart
*Assistant Examiner* — Peter Cheng
(74) *Attorney, Agent, or Firm* — Fish & Richardson P.C.

(57) ABSTRACT

In one embodiment, data for a plurality of sessions is received. For example, a plurality of packets for voice data may be received from a plurality of end points. A destination for each of the connections is then determined. For example, the voice data may be destined for different gateways (and other end points). In some cases, the voice data for the sessions may be destined for the same destination. In this case, a plurality of packets is multiplexed into a multiplexed packet. The multiplexed packet includes a layer three network header. Also, each of the packets in the multiplexed packet includes a transport packet header. The multiplexed packet is then sent to the single destination. Each of the packets in the multiplexed packet can be extracted and processed as if a single one of the packets was received individually.

22 Claims, 7 Drawing Sheets

Multiplexed packet format

Fig. 5 Multiplexed packet format

GENERIC UDP MULTIPLEXING FOR VOICE OVER INTERNET PROTOCOL (VOIP)

TECHNICAL FIELD

Particular embodiments generally relate to networking.

BACKGROUND

In communications, such as voice communications, voice data may be received in time division multiplexing (TDM) data for many different calls. The data may be received at a gateway and may be destined for multiple other gateways on an IP network. The data for a call is packetized and each packet is sent individually in an IP packet to a gateway. Each packet transported individually requires headers to be added. In case of IP version 4 typically a header of 38 bytes is added and in case of IP version 6 a header of 58 bytes is added. This header uses a lot of bandwidth and can far exceed the bandwidth required for the actual voice payload or be a significant percentage of the voice payload depending upon the encoding of voice.

Multiplexing may be used to insert data belonging to multiple calls into a single IP packet. For example, a voice payload that would be sent in a packet for a call may be included in the IP packet along with voice payloads from other calls. Because the goal is to save as much bandwidth as possible, as much header information as possible is removed. Further, when the IP packet is received at a destination, because as much header information as possible has been stripped out of the data in the IP packet, additional processing may be needed to process this packet such that it can be sent to its final destination. The additional processing includes determining information that would normally be included in the header, such as layer 4 information. Accordingly, bandwidth may be saved by sending a reduced header in the IP packet; however, additional processing is needed to generate the individual packets and process them from the data sent in the IP packet, which may increase latency or reduce the performance of the system.

DESCRIPTION OF EXAMPLE EMBODIMENTS

Overview

In one embodiment, data for a plurality of sessions is received. For example, a plurality of packets for voice data may be received from a plurality of end points. A destination for each of the connections is then determined. For example, the data may be destined for different gateways (and other end points). In some cases, the packets for the different sessions may be destined for the same destination gateway. In this case, a plurality of packets are multiplexed into a single packet. The multiplexed packet includes a layer three network header. Also, each of the packets in the multiplexed packet includes a transport packet header. The transport packet header may include a transport layer header and application layer header (e.g., a UDP header and RTP header). Whether the receiving gateway is capable of handling multiplexed packet is negotiated during call setup using the signaling protocol (SIP/H.323). If the receiving gateway is capable of handling multiplexed packets, packets destined to that specific gateway are multiplexed.

The multiplexed packet is then sent to its destination gateway. Each of the packets in the multiplexed packet can be extracted and processed as if a single packet. This is because a transport packet header (e.g., UDP+RTP) is included for each packet added to the multiplexed packet. Thus, bandwidth may be saved by including multiple packets in a multiplexed packet as a single layer 3 header and single layer 2 header are used for this combined packet. However, latency in processing is not compromised as the packets may be processed as if they were sent individually because the transport packet header for each of the packets is included in the multiplexed packet. Also when generating the multiplexed packet the system does not wait for multiple packets to be available, but rather uses the packets that are already waiting to be processed.

Example Embodiments

Figure 1:
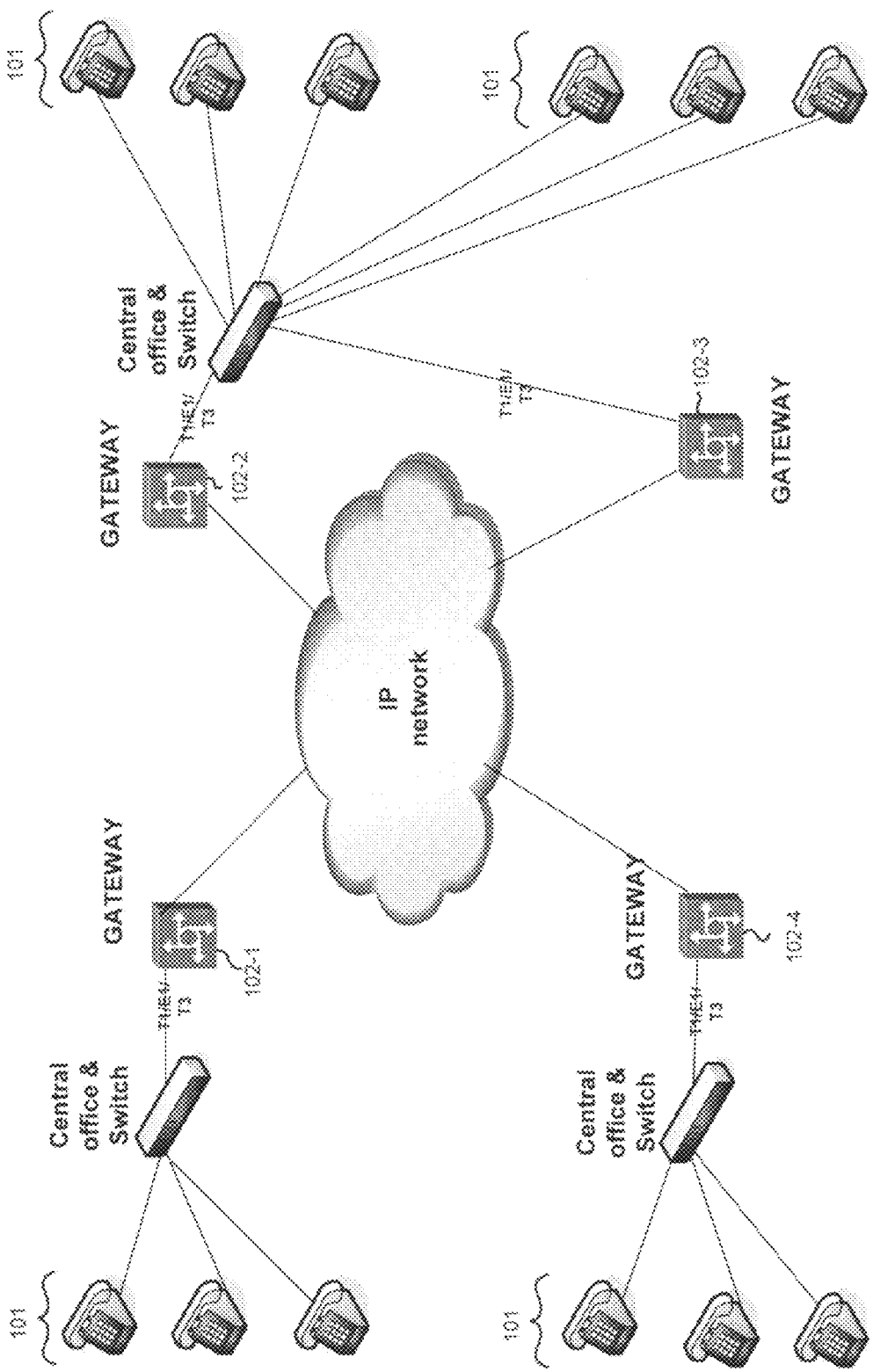
FIG. 1 depicts an example of a system for sending multiplexed packets.

FIG. 1 depicts an example of a system for sending multiplexed packets. As shown, a plurality of end points 101, a plurality of gateways 102, a plurality of central offices, and a network 104 are provided.

End points 101 may be any devices capable of sending data. For example, end points 101 may include voice over IP telephones, personal computers, instant messaging clients, blackberry devices, cellular telephones, etc. The data may be sent though a central office 103. Although a central office is described, it will be understood that other components may be used to send the data.

Gateway 102 may be any networking device configured to send packets. For example, gateway 102 may connect to internet protocol (IP)-based networks. Examples of gateway 102 may be a TDM-to-IP gateway, session border controllers, session initiation protocol (SIP) proxies, IP-PBXs (private branch exchanges), media gateways, soft switches, back-to-back user agents (B2BUAs), IP-to-IP gateways, etc. Gateways 102 may sit in between end points and may interconnect various networks that use different protocols and services. Although not shown, gateways 102 connect to end points and are configured to transport data between end points. For example, as shown, gateways 102 are connected to T3/T1/E1 or any other kind of communication line and receive packets from end points. In one embodiment, the packets may include time division multiplex (TDM) voice data.

Gateways 102 are configured to receive the voice data, packetize it, and send it through network 104. Although voice data will be described, it will be understood that other data may also be sent. Network 104 may be an IP-based network that is configured to route IP packets. The IP packets may be of any format, such as IPv4, IPv6, or any other similar or successor IP protocol. In one embodiment, the TDM voice data is packetized as real-time protocol (RTP) packets. These packets include the data received from the end points.

Particular embodiments are configured to multiplex multiple packets and include them in a single packet (referred to as a multiplexed packet). The multiple packets may be referred to individually as transport packets. The format of the transport packets may be in a format as if they were sent individually in an IP packet through network 104. For example, the transport packets include a transport packet header (e.g., UDP and RTP headers), and payload). The transport packet header may include any information that is needed to process a transport packet as if it was sent individually in an IP packet. The transport packet header may be determined according to a protocol, such as user datagram protocol (UDP)), transport control protocol (TCP), or any other transport layer protocol. Also, the transport packet may include an application layer header, such as real time transfer protocol (RTP), or any other application layer header. Further, the transport packet also includes a payload that includes the data received from an end point.

The transport packets are multiplexed to create the multiplexed packet. The multiplexed packet includes a network layer header (layer 3), such as an IP header in the format of IPv4, IPv6, etc. Only one network layer header is included per multiplexed packet. The multiplexed packet also includes multiple transport packets. Because the format of the transport packet is retained, latency in processing the individual transport packets may be saved at the receiving end. This is because the transport packets can be processed as if they were sent individually in an IP packet. Accordingly, bandwidth is saved by including multiple transport packets in a single multiplexed packet because individual IP packets do not have to be sent for each transport packet. Thus, bandwidth overhead is saved because each transport packet does not need to have a network layer header and layer 2 header. Further, additional processing time is saved because the network layer header needs to be processed only once for each of the transport packets included in the multiplexed packet. If individual packets were sent, the network layer header would have to be processed for each IP packet received. Thus, if five transport packets are included in a multiplexed packet, the network layer header is parsed once for the five transport packets. However, if each transport packet is sent in its own IP packet, the network layer header needs to be processed five times. Also, additional processing to have transmitted those packets individually is not required. For example, if the transport packet header is removed and just the payload is included in the multiplexed packet, additional processing may be needed at the receiving end to determine the transport packet header at the receiving gateway in order to send the payload data to final or next end point.

Figure 2:
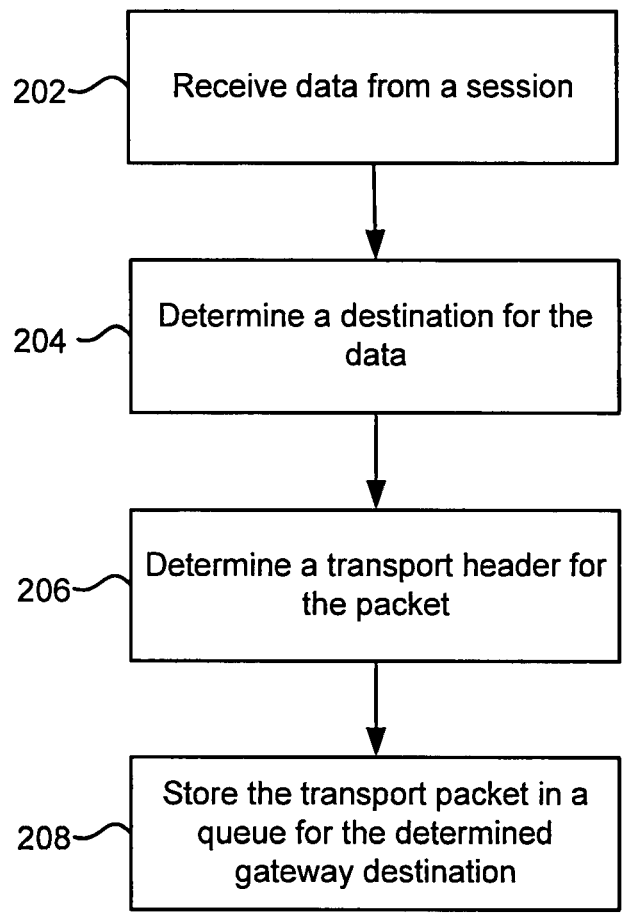
FIG. 2 shows an example method for generating a multiplexed packet.

FIG. 2 shows an example method for generating a multiplexed packet. Step 202 receives data from a session. For example, the session may be for a voice call connection between end points. The connection may be a connection between end points, such as in a voice call. Also, the data may be voice data, or any other kind of media.

Step 204 determines a gateway 102 destination for the data/voice payload. For example, an IP address in which to send the data is determined. This IP address may be for a gateway, such as gateway 102-2 or gateway 102-3.

Step 206 determines a transport packet header (e.g., UDP and RTP header) for the packet. The transport packet header is determined as it would be for processing a conventional voice packet received from a digital signal processor (DSP). The transport packet (UDP header, RTP header followed by the voice payload) is generated just as it would for a conventional voice packet.

Step 208 stores the transport packet in a queue for the determined gateway destination.

The process then reiterates to step 202 where more data from the same connection or a different session may be received. For example, gateway 102-1 may be servicing a number of sessions, such as a number of voice calls may be being serviced by gateway 102-1. Data for any of these sessions may be received and may be destined for different end points. These end points may be serviced by different gateways, such as gateways 102-2 and 102-3. As mentioned above, data for the same gateway 102 is multiplexed together into the multiplexed packet. Accordingly, during multiple reiterations, if data for the same gateway 102 is received, it is processed as described in steps 202, 204, and 206 where another transport header is generated for the voice packet from the DSP. This second transport packet for the same destination gateway is appended to the previous packets if present in step 208. If the data is for a different gateway 102, for which there are not any packets already available the same process may be performed except that a generated transport packet is stored in another queue for the other gateway 102.

The above process continues as data is received for different gateway destinations and stored in the queues accordingly. This continues until it is determined that a multiplexed packet should be sent.

Figure 3:
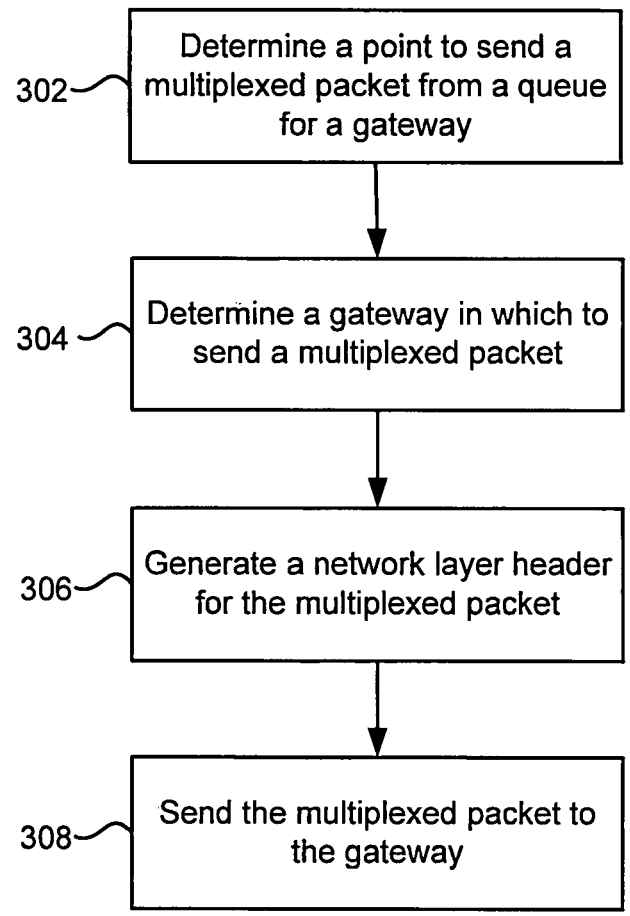
FIG. 3 shows an example of a method for sending a multiplexed packet.

FIG. 3 shows an example of a method for sending a multiplexed packet. Step 302 determines a point to send a multiplexed packet from a queue for a gateway. For example, a multiplexed packet may be sent from gateway 102-1 to gateway 102-2. If there are voice packets received at the gateway, they would be processed and sent as individual or as multiplexed packets. Also, as multiple transport packets are appended to a queue and once their combined size reaches a certain threshold, the number of packets appended reaches a certain threshold, or there are no more packets waiting to be processed, the multiplexed packet is sent. If any of the above events occurs, the multiplexed packet can be sent. Using the events ensures multiplexing does not introduce any latency because of the multiplexing. The number of transport packets included in a multiplexed packet may vary as it would depend upon the codec type used for the different sessions or also may depend upon the number of sessions then present in the system.

Step 304 determines a gateway 102 to send a multiplexed packet. Each gateway 102 may have its own specific queue (or multiple queues). Also, each gateway is associated with an IP address.

Step 306 then generates a network layer header for the multiplexed packet. The network layer header may be of any format, such as IPv4, IPv6, or any other IP format. Additionally, the first transport packet added has a multiplexing indication header to indicate it is a multiplexed packet. This is because a receiving gateway 102 may need to know how to process packets that are received. For example, if this is a multiplexed packet, then the receiving gateway 102-2 has to extract the various packets found in the multiplexed packet. However, if only a single transport packet is included in an IP packet, then it may be processed as typical voice packet.

Step 308 then sends the multiplexed packet to gateway 102-2. This packet is sent as normal IP packets may be sent.

Figure 4:
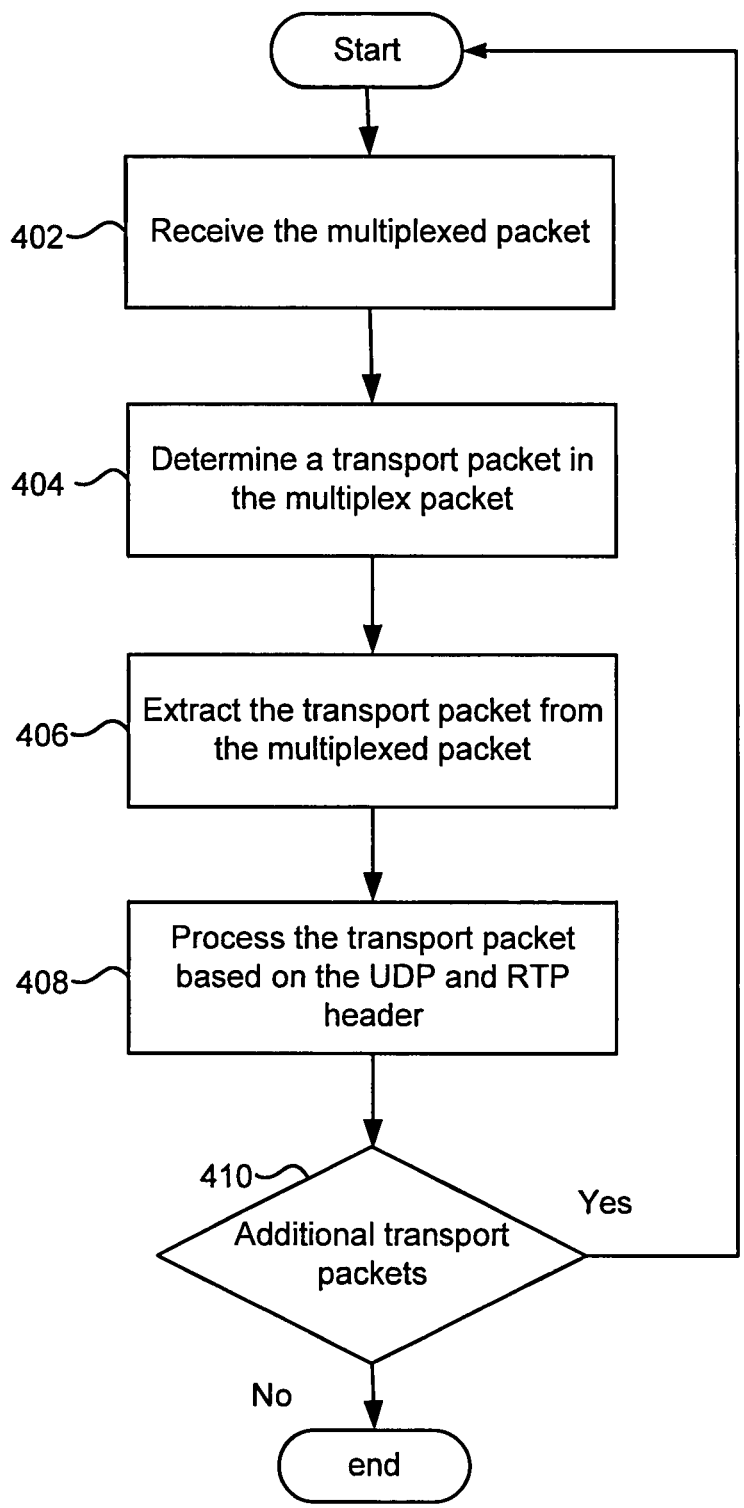
FIG. 4 shows an example of a method for processing a received multiplexed packet.

FIG. 4 shows an example of a method for processing a received multiplexed packet. Step 402 receives the multiplexed packet, e.g., gateway 102-2 may receive the multiplexed packet. Gateway 102-2 may then determine if the packet is a multiplexed packet or a regular voice packet. For discussion purposes, it is assumed this is a multiplexed packet. However, if it was not a multiplexed packet, then the packet would be processed conventionally.

Step 404 determines a transport packet in the multiplexed packet. For example, the beginning of the first transport packet may be determined by looking at the end of the network layer header. Then, a transport packet header for the transport packet may be analyzed to determine the length of the first transport packet. For example, a UDP header in the transport packet header includes the length of the transport packet, specifically the first transport packet, has an altered header to indicate the combined length of the packet and also has the Multiplexing indication header to indicate multiplexing and also length of the first transport packet.

Step 406 then extracts the transport packet from the multiplexed packet. For example, the transport packet header (e.g., UDP and RTP header) application layer header (RTP header), and payload may be extracted. This constitutes a transport packet that can be processed and sent to an end point.

Step 408 then processes the transport packet based on the UDP header and RTP header like a conventional voice packet. For example, the payload may be extracted and sent in packets to end points. The end points to which to send the payload data are determined based on the UDP header and RTP header.

Step 410 determines if there are additional transport packets in the multiplexed packet. If so, the process reiterates to step 402. In this case, an additional transport packet is determined. The additional transport packet may be determined based on the total length specified in transport packet header of the first transport packet. This process may continue as the different transport packets are extracted from the multiplexed packet.

When the last transport packet is extracted, the process ends and an additional multiplexed packet may be processed. Gateway 102-2 may determine that the multiplexed packet has been processed because the total length of the multiplexed packet is known and the lengths of each transport packet are known; thus when the total multiplexed packet length has been reached, processing is stopped. Accordingly, each transport packet in the multiplexed packet is extracted.

Figure 5:
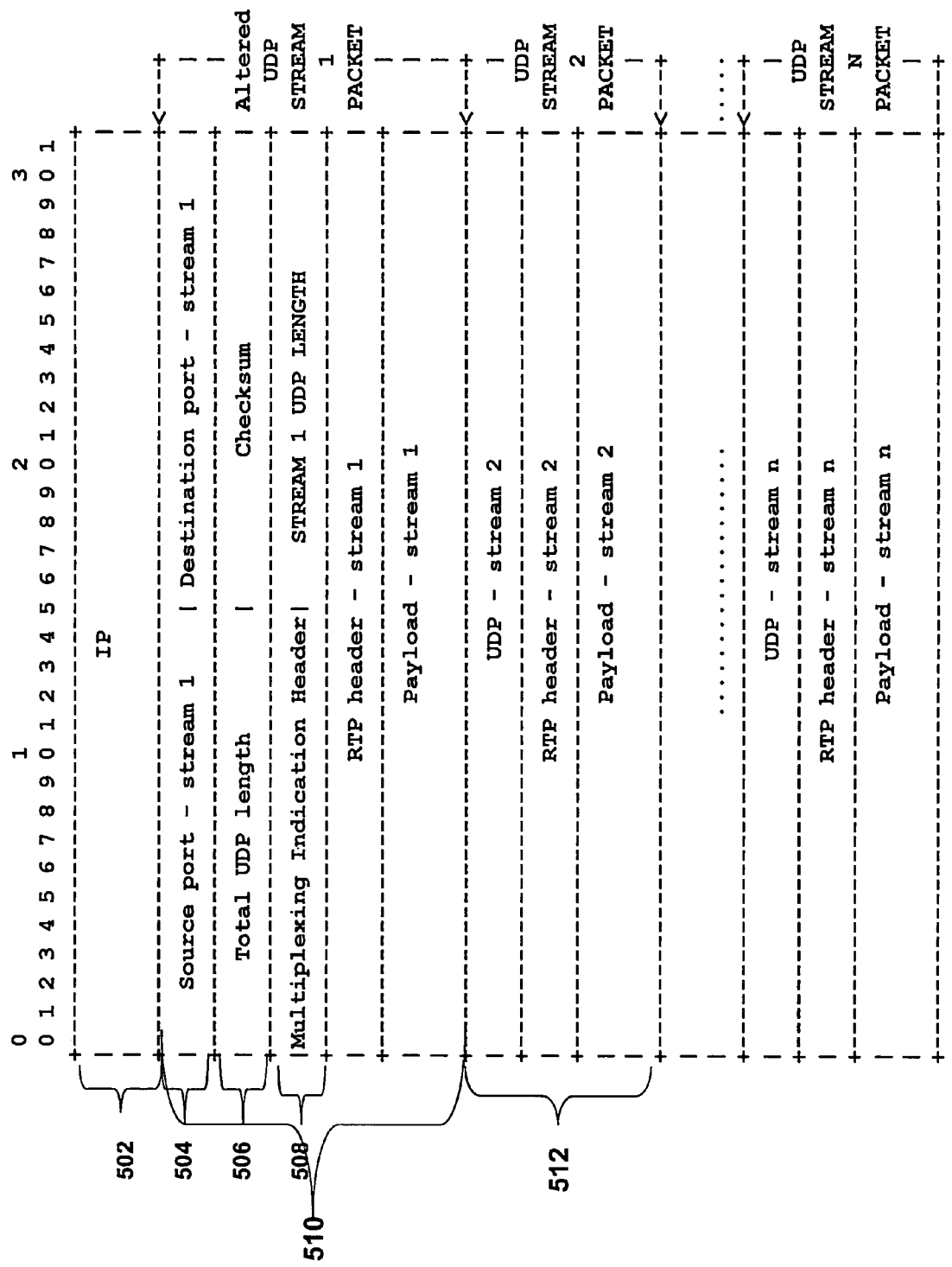
FIG. 5 shows an example of a multiplexed packet format.

FIG. 5 shows an example of a multiplexed packet format. This format is shown as an IPv4 packet format; however, it will be understood that other IP packet formats may be used, such as IPv6, etc. A person skilled in the art will appreciate changes to the format shown in FIG. 5 to generate an IPv6 packet. For discussion purposes, the format of an IPv4 packet will be described.

Area 502 includes standard IPv4 information for a header, which may include the version, header length, type of service, total length, identification, flags, fragment offset, time to live, protocol, etc. Other information may also be included.

Stream, session and call may mean the same thing in the context of this document. Also, area 504 may include the source UDP port number and destination UDP port number for the session.

Area 506 may include the total packet length and a checksum. The total packet length is the total length of the header and data in the packet. The checksum is used for error checking the header.

Area 508 includes a multiplexing indication header. This indicates that this packet is a multiplexed packet instead of a packet that includes a single transport packet. This allows a receiving gateway 102 to determine whether or not multiple transport packets need to be extracted from a multiplexed packet. The multiplexing indication header is added to the end of the first UDP header and may indicate the internet-assigned numbers authority (IANA) assigned protocol number. This may be provided by the organization that oversees IP addresses and may be a ushort header that is 16 bits. The multiplexing indication header would be distinguishable from the RTP header. This is because there are 16 bits assigned to indicate the multiplexing indication header, in case of the multiplexed packet the most significant eight bits are zero whereas in case of RTP packets the most significant bit itself would be one, indicating RTP version 2.

Area 510 shows the first transport packet. This includes a transport packet header, multiplexing indication header, RTP header, and payload. The transport packet header would indicate the total packet length for the transport packet. The first stream's UDP length is present after the multiplexing indication header. The Steam 1 UDP length field is 12 bits and the 4 most significant bits remaining are marked as reserved. A second transport packet 512 is shown that also includes its own transport packet header and payload. Other packets are included up to transport packet N. Each of the transport packets included in the multiplexed packet includes its own transport packet header and payload.

Figure 6:
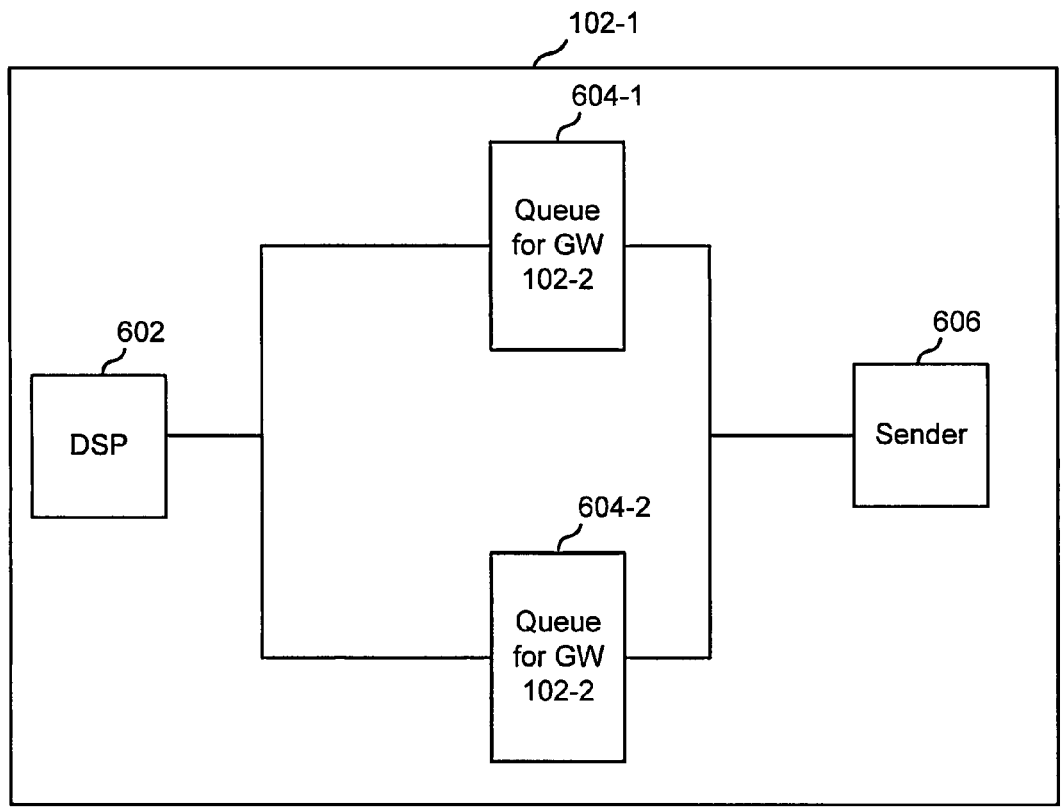
FIG. 6 shows an example of a sending gateway.

FIG. 6 shows an example of a sending gateway 102-1. As shown, a DSP 602, queues 604, and sender 606 are provided.

A plurality of digital signal processors (DSP) 602 within a gateway 102-1 receives packets for a plurality of connections and sends them for further processing to transmit the packet to its destination. DSP 602 is configured to packetize the data. For example, DSP 602 packetizes the data into individual packets. These packets are processed by sending gateway 102-1 to obtain the transport packet header to create the transport packet. The transport packets include a format that may be used to send the data through IP network 104 if multiplexing was not used.

Gateway 102-1 then determines another gateway the packet is destined for. For example, as shown, queue 604-1 and 604-2 are provided where queue 604-1 is for gateway 102-2 and queue 604-2 is for gateway 102-3.

Assuming the transport packet is for gateway 102-2, the transport packet is stored in queue 604-1. This process continues as data is received at DSP 602 and packetized. It is stored in various queues 604 until the transport packets are sent in a multiplexed packet.

If the combined size of packets that are placed into a queue exceeds a certain threshold (lower than the MTU), or if the count of the packets that are present in a queue exceeds a certain threshold or if there are no more packets waiting to be processed, then gateway 102-1 transmits the multiplexed packet.

If multiple transport packets were included in queue 604-1, then sender 606 generates a multiplexed packet. A network layer header is included and the multiplexed packet includes a number of transport packets that are destined for gateway 102-2. Sender 606 then sends the multiplexed packet to gateway 102-2. Similarly, sender 606 generates a multiplexed packet for gateway 102-3 using transport packets stored in queue 604-2. This multiplexed packet is then sent to gateway 102-3.

Figure 7:
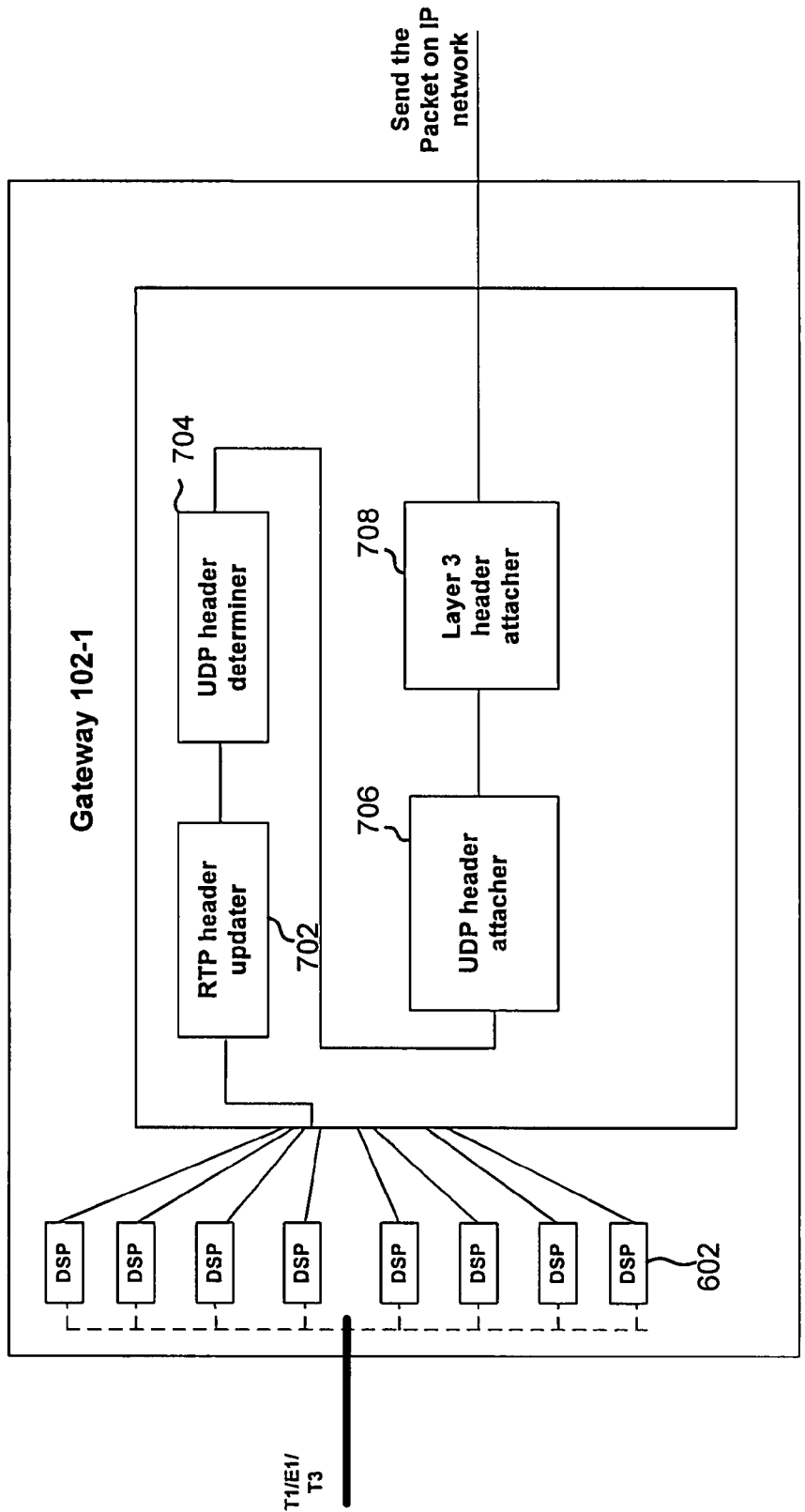
FIG. 7 shows a more detailed example of a sending gateway.

FIG. 7 shows a more detailed example of sending gateway 102-1. This example shows processing when a multiplexed packet is generated and sent. A plurality of DSPs 602 receive voice data from end points 101. A RTP header updater 702 is configured to generate a RTP header for each transport packet.

UDP header determiner 704 is configured to determine the UDP header for the multiplexed packet. RTP and UDP header attacher 706 then attaches the RTP and UDP layer header for each transport packet. Further, the first UDP header may be altered to include the multiplexing indication header indicating that this packet is a multiplexing packet. A payload may also be attached for each transport packet.

Layer 3 header attacher 708 then attaches a network layer header for the multiplexing packet. The multiplexing packet is then sent through IP network 104.

Figure 8:
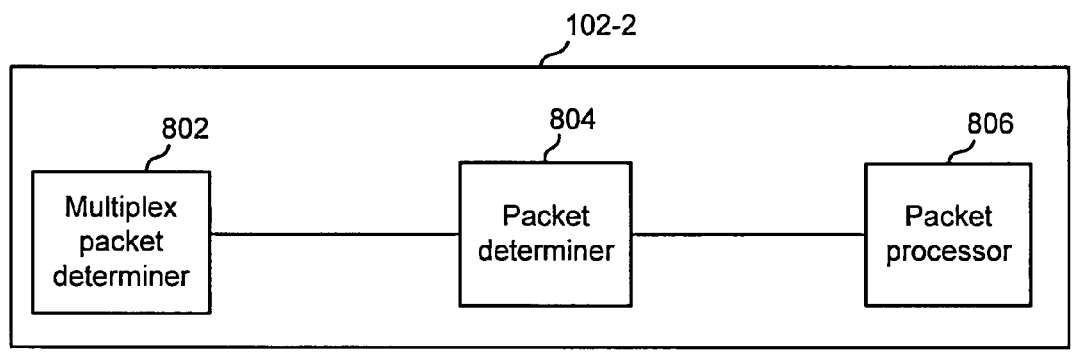
FIG. 8 shows an example of receiving gateway.

FIG. 8 shows an example of a receiving gateway 102. For example, either gateway 102-2 or gateway 102-3 may receive a multiplexed packet. A multiplexed packet determiner 802 then determines if the packet is a multiplexed packet. For example, the multiplexing indication header may be checked in the multiplexed packet to determine if multiple transport packets are included in the packet or not.

Assuming that this is a multiplexed packet, a packet determiner 804 determines various transport packets that are included in the multiplexed packet. The different transport packets may be extracted and sent to packet processor 806. Because the transport packet header was included in the transport packet, no additional processing is needed to process the transport packet than would have been necessary if the individual transport packet was sent in the packet without multiplexing. Accordingly, packet processor 806 processes the transport packet as it would have without multiplexing. In this case, the payload from the transport packet may be sent to an end point through one or more DSPs.

Accordingly, latency is avoided and also additional processing is not required other than to extract the packets from the multiplexed packet. This marginally improves performance of the system while saving significant bandwidth. Performance is not sacrificed in order to save the bandwidth.

Particular embodiments provide many advantages. For example, there is minimal or no distinguishable deterioration in voice quality for any connection (session) if one of the multiplexed packets is lost. This is because the multiplexed packet may include packets for many different sessions. Thus, if a single packet for multiple sessions is lost, then no noticeable voice deterioration may be heard by a user. However, if packets for a single session are multiplexed into one multiplexed packet and the multiplexed packet is lost, noticeable voice deterioration may result.

Also, the number of packets that need to be sent is reduced because multiple transport packets are included in a single IP packet. This reduces the interrupts and improves the performance of the gateway. The number of interrupts is reduced because the number of IP packets that are received by a gateway is reduced. Thus, instead of receiving five individual IP packets and determining how to process them, a single IP packet may be received and five transport packets extracted from it.

The overhead saved may be 18 bytes for layer 2, and 20-40 bytes for IPv4 and IPv6, respectively, for layer 3. The bandwidth overhead saved is by not including an IP header for each transport packet when sending the IP packets individually. Thus, a savings of 38 bytes in the case of IPv4 and 58 bytes for IPv6 is realized if each packet is not sent separately.

Although the description has been described with respect to particular embodiments thereof, these particular embodiments are merely illustrative, and not restrictive. For example, data other than voice may be sent in multiplexed packets.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method comprising:
    receiving, at a source gateway, data for one or more sessions;
    determining, at the source gateway and for each session in the one or more sessions, a destination gateway for the data;
    generating, by the source gateway, one or more transport packets for the data, each transport packet including a transport packet header and payload data;
    placing, at the source gateway, one or more transport packets destined for a first destination gateway in a first queue and one or more transport packets destined for a second destination gateway in a second queue;
    generating, using the source gateway, a first multiplexed packet for the first destination gateway by inserting the one or more transport packets placed in the first queue in the first multiplexed packet, each of the one or more transport packets including a distinct User Datagram Protocol (UDP) header and payload data, the first multiplexed packet including a multiplexing indication header that is included as part of a UDP header of an initial transport packet inserted in the first multiplexed packet, the multiplexing indication header including information indicating that the first multiplexed packet is a multiplexed packet;
    determining, by the source gateway, whether a threshold number of transport packets in the first queue is reached; and
    sending, by the source gateway, the first multiplexed packet to a first destination gateway based on determining that the threshold number of transport packets in the first queue is reached.

2. The method of claim 1, wherein a transport packet header includes a transport layer header and an application layer header.

3. The method of claim 2, wherein the transport layer header comprises a user datagram protocol header and the application layer header comprises a real time transfer protocol header.

4. The method of claim 2, wherein the transport layer header comprises a Transmission Control Protocol (TCP) header.

5. The method of claim 1, where the first destination gateway is configured to process the first multiplexed packet based on the multiplexing indication header included in the first multiplexed packet.

6. The method of claim 1, wherein the one or more transport packets included in the first multiplexed packet are processed by a receiving network device as individual Internet Protocol (IP) packets.

7. The method of claim 1, wherein receiving data comprises receiving data in a plurality of time division multiplex (TDM) packets, wherein the data in the TDM packets is included in the one or more transport packets.

8. The method of claim 1, further comprising:
    storing the generated one or more transport packets in one or more queues; and
    generating a multiplexed packet using the one or more transport packets from a queue in the one or more queues.

9. The method of claim 1, wherein determining, by the source gateway, whether a threshold number of transport packets in the first queue is reached comprises:
    determining, by the source gateway, whether no additional transport packets are waiting in the first queue; and
    sending, by the source gateway, the first multiplexed packet to the first destination gateway based on determining that no additional transport packets are waiting in the first queue.

10. A method comprising:
    receiving, at a destination gateway, a multiplexed packet, the multiplexed packet including a network layer header;
    determining, by the destination gateway, a plurality of transport packets in the multiplexed packet, wherein the plurality of transport packets includes a threshold number of transport packets, and wherein each transport packet in the plurality of transport packets includes a payload and a transport packet header comprising a distinct User Datagram Protocol (UDP) header, a first transport packet included in the multiplexed packet including a multiplexing indication header as part of a UDP header of the first transport packet, the multiplexing indication header including multiplexing information associated with the multiplexed packet;

determining, by the destination gateway, the transport packet header for each transport packet of the plurality of transport packets; and sending, by the destination gateway, the payload in each transport packet in the plurality of transport packets to a destination end point based on information included in the associated transport packet header.

11. The method of claim 10, further comprising determining whether the multiplexed packet includes a plurality of transport packets based on the multiplexing indication header.

12. The method of claim 10, wherein the plurality of transport packets are processed as individual Internet Protocol (IP) packets.

13. An apparatus comprising:
one or more processors of a gateway; and
instructions encoded in one or more non-transitory tangible media for execution by the one or more processors of the gateway and when executed, operable to:
receive data for one or more sessions;
determine, for each session in the one or more sessions, a destination for the data;
generate, by the one or more processors of the gateway, one or more transport packets for the data, each transport packet including a transport packet header and payload data;
place one or more transport packets destined for a first destination gateway in a first queue and one or more transport packets destined for a second destination gateway in a second queue;
generate, by the one or more processors of the gateway, a first multiplexed packet for the first destination gateway by inserting the one or more transport packets placed in the first queue in the first multiplexed packet, each of the one or more transport packets including a distinct User Datagram Protocol (UDP) header and a payload data, the first multiplexed packet including a multiplexing indication header that is included as part of a UDP header of an initial transport packet inserted in the first multiplexed packet, the multiplexing indication header including information indicating that the first multiplexed packet is a multiplexed packet;
determine, by the one or more processors of the gateway, whether a threshold number of transport packets in the first queue is reached; and
send, by the one or more processors of the gateway, the first multiplexed packet to a first destination gateway based on determining that the threshold number of transport packets in the first queue is reached.

14. The apparatus of claim 13, wherein a transport packet header includes a transport layer header and an application layer header.

15. The apparatus of claim 14, wherein the transport layer header comprises a user datagram protocol header and the application layer header comprises a real time transfer protocol header.

16. The apparatus of claim 14, wherein the transport layer header comprises a Transmission Control Protocol (TCP) header.

17. The apparatus of claim 13, wherein the first destination gateway is configured to process the first multiplexed packet based on the multiplexing indication header included in the first multiplexed packet.

18. The apparatus of claim 13, wherein the one or more transport packets included in the first multiplexed packet are processed by a receiving network device as individual Internet Protocol (IP) packets.

19. The apparatus of claim 13, wherein the instructions that are operable to determine, by the one or more processors of the gateway, whether a threshold number of transport packets in the first queue is reached comprises instructions that are operable to:
determine, by the one or more processors of the gateway, whether no additional transport packets are waiting in the first queue; and
send, by the one or more processors of the gateway, the first multiplexed packet to the first destination gateway based on determining that no additional transport packets are waiting in the first queue.

20. An apparatus comprising:
one or more processors of a gateway; and
instructions encoded in one or more non-transitory tangible media for execution by the one or more processors and when executed, operable to:
receive a multiplexed packet, the multiplexed packet including a network layer header;
determine, by the one or more processors of the gateway, one or more transport packets in the multiplexed packet, wherein the one or more transport packets include a threshold number of threshold packets, wherein each transport packet in the one or more transport packets includes a payload and a transport packet header comprising a distinct User Datagram Protocol (UDP) header, a first transport packet included in the multiplexed packet including a multiplexing indication header as part of a UDP header of the first transport packet, the multiplexing indication header including multiplexing information associated with the multiplexed packet;
determine, by the one or more processors of the gateway, the transport packet header for each transport packet of the one or more transport packets; and
send, by the one or more processors of the gateway, the payload in each of the one or more transport packets to a destination end point based on information included in the associated transport packet header.

21. The apparatus of claim 20, wherein the instructions when executed are further operable to determine whether the multiplexed packet includes a plurality of transport packets based on the multiplexing indication header.

22. The apparatus of claim 20, wherein the one or more transport packets are processed as Internet Protocol (IP) packets.

* * * * *

UNITED STATES PATENT AND TRADEMARK OFFICE
CERTIFICATE OF CORRECTION

| | | |
|---|---|---|
| PATENT NO. | : 8,553,692 B2 | Page 1 of 1 |
| APPLICATION NO. | : 11/716272 | |
| DATED | : October 8, 2013 | |
| INVENTOR(S) | : Roay | |

It is certified that error appears in the above-identified patent and that said Letters Patent is hereby corrected as shown below:

In the specification

Column 5, line 65, replace
    "ushort" with "short"

Column 9, line 21, should read
    that follow, "a", [[an]]"an", and "the" includes plural references unless Signed and Sealed this
Sixth Day of October, 2015

Michelle K. Lee
*Director of the United States Patent and Trademark Office*